(12) United States Patent
Hess et al.

(10) Patent No.: US 9,798,776 B2
(45) Date of Patent: *Oct. 24, 2017

(54) SYSTEMS AND METHODS FOR PARSING SEARCH QUERIES

(71) Applicant: MapQuest, Inc., Denver, CO (US)

(72) Inventors: Stephen Hess, Red Lion, PA (US); Antony Pegg, East Petersburg, PA (US); Brian Quinion, Sheffield (GB); Kevin Mayhew, Red Lion, PA (US)

(73) Assignee: Mapquest, Inc., Denver, CO (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/008,354

(22) Filed: Jan. 27, 2016

(65) Prior Publication Data
US 2016/0140182 A1  May 19, 2016

Related U.S. Application Data

(63) Continuation of application No. 13/887,097, filed on May 3, 2013, now Pat. No. 9,317,608.

(51) Int. Cl.
*G06F 17/30* (2006.01)

(52) U.S. Cl.
CPC .... *G06F 17/30528* (2013.01); *G06F 17/3087* (2013.01); *G06F 17/30241* (2013.01); *G06F 17/30477* (2013.01); *G06F 17/30643* (2013.01); *G06F 17/30654* (2013.01); *G06F 17/30663* (2013.01); *G06F 17/30684* (2013.01); *G06F 17/30864* (2013.01); *G06F 17/30867* (2013.01)

(58) Field of Classification Search
CPC ................................. G06F 17/30684
See application file for complete search history.

(56) References Cited

U.S. PATENT DOCUMENTS

| 6,766,320 | B1 | 7/2004 | Wang et al. |
|---|---|---|---|
| 2007/0143264 | A1 | 6/2007 | Szeto |
| 2008/0301092 | A1 | 12/2008 | Jayanti et al. |
| 2009/0171953 | A1 | 7/2009 | Morris et al. |
| 2011/0153654 | A1 | 6/2011 | Lee |

FOREIGN PATENT DOCUMENTS

WO  WO 2009/064312  5/2009

*Primary Examiner* — Kris Mackes

(57) ABSTRACT

Computer-implemented systems and methods are provided for parsing search queries. In accordance with some embodiments, search records including character strings are retrieved, and search query templates are generated comprising sequences of categories corresponding to character substrings of the character strings. Also, in accordance with some embodiments, search queries are parsed into character substrings and matched with a search query template. The search query template may then be used to associate categories with the character substrings. A search engine may use the categories to focus or otherwise refine a search based on parsed search query.

20 Claims, 7 Drawing Sheets

SYSTEMS AND METHODS FOR PARSING SEARCH QUERIES

CROSS-REFERENCE TO RELATED APPLICATIONS

This application is a continuation of U.S. application Ser. No. 13/887,097, filed May 3, 2013 (now allowed), the entire contents of which are hereby incorporated by reference.

BACKGROUND

Technical Field

The present disclosure relates to computerized data processing and search technologies. More particularly, and without limitation, the present disclosure relates to systems and methods for identifying search query input scenarios, and techniques for classifying terms and/or phrases of search queries based on known input scenarios.

Background

Use of the Internet has grown significantly in recent years. Internet access is now available from a variety of devices, such as personal computers, laptops, tablets, personal digital assistants (PDAs), mobile phones, smart-phones, televisions, and other devices. With the increased access to the Internet from a wide variety of devices, people have become more reliant than ever on online search engines to submit queries and find desired information.

Web sites offer a variety of different search engines for finding desired information from a large pool of available information. Both generalized search engines and specialized search engines are available. For example, Google™ and Bing™ provide web sites for conducting generalized web searches. Specialized search engines are available for searching within particular websites or content categories. For example, search engines are available for searching for news, products, jobs, events, entertainment, legal information, medical information, geographic or map information, recipes, friends, real estate and much more. There are also specialized search engines for searching for particular types of content. For example, search engines are available for searching for audio files, video files, local content, and other types of specific information or content.

Some search engines build searchable indexes of information from relational databases, which contain structured information. This information often contains metadata or is otherwise labeled. When searching against such structured information, it is beneficial to label a term or phrase in a search query, and to compare the label with the labels in the indexed information to obtain more relevant results. For example, a user entering a search query for the word "Washington" may receive search results relating to George Washington, when the user intended to search for information about Washington, D.C. However, if the term "Washington" in the search query were labeled as a city, the search engine could search indexed information for only "Washington" terms labeled as referring to the city.

There are a variety of different ways in which search engines allow users to enter queries. Some search engines provide separate fields or codes, allowing a user to designate a particular query term or phrase as relating to a particular type of information, and thereby associate the term or phrase with a label. For example, a bookseller may provide a search allowing a user to search through only book titles or author names for a particular term. However, requiring a user to select a field or code may overly restrict the scope of a search, or may confuse users.

Other search engines provide a field for entering a search query in a natural language format. These search engines may separate a search query into terms after the user has entered the search query, and may search for all combinations of the terms. However, such an approach is computationally intensive and error prone. Alternatively, search engines may attempt to identify types of terms in a natural language search based on comparisons with pre-stored terms in a dictionary or database. However, such an approach may introduce a large number of false positives for queries whose terms were not intended to have the same meaning as the corresponding terms in the dictionary. Accordingly, while it would be beneficial to label terms or phrases in search queries, current approaches are computationally intensive, error prone, restrictive, and/or confusing for users.

SUMMARY

Embodiments of the present disclosure provide improved systems and methods for parsing search queries. Embodiments of the present disclosure also provide systems and methods for semantically annotating terms or phrases of search queries. Embodiments of the present disclosure also encompass techniques for generating query templates of common search query structures for use in parsing and semantically annotating terms or phrases of search queries. The embodiments presented herein also address one or more of the disadvantages of conventional systems and methods, such as those highlighted above.

In accordance with the present disclosure, there is provided a computer implemented method for parsing a search query. The method comprises one or more steps performed by at least one processor, including receiving a character string, identifying a sequence of character substrings in the character string, and retrieving, from a storage device, a search query template including a sequence of categories. The method also comprises determining, by at least one processor, that a character substring in the sequence of character substrings corresponds to a category in the sequence of categories and associating the category with the character substring.

Also in accordance with the present disclosure, there is provided a computer system for parsing a search query. The computer system comprises a memory device that stores a set of instructions and at least one processor that executes the set of instructions. The at least one processor is configured to receive a character string, identify a sequence of character substrings in the character string, and retrieve a search query template including a sequence of categories. The processor is also configured to determine that a character substring in the sequence of character substrings corresponds to a category in the sequence of categories and associate the category with the character substring.

Further in accordance with the present disclosure, there is provided a non-transitory computer-readable medium that stores a set of instructions that, when executed by at least one processor, configures the at least one processor to carry out a method. The method comprises receiving a character string, identifying a sequence of character substrings in the character string, and retrieving a search query template including a sequence of categories. The method also comprises determining that a character substring in the sequence of character substrings corresponds to a category in the sequence of categories and associating the category with the character substring.

Before explaining exemplary embodiments consistent with the present disclosure in detail, it is to be understood that the disclosure is not limited in its application to the details of constructions and to the arrangements set forth in the following description or illustrated in the drawings. The disclosure is capable of embodiments in addition to those described and is capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain the principles of the disclosure.

As such, those skilled in the art will appreciate that the conception upon which this disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

DETAILED DESCRIPTION OF EXEMPLARY EMBODIMENTS

Figure 1:
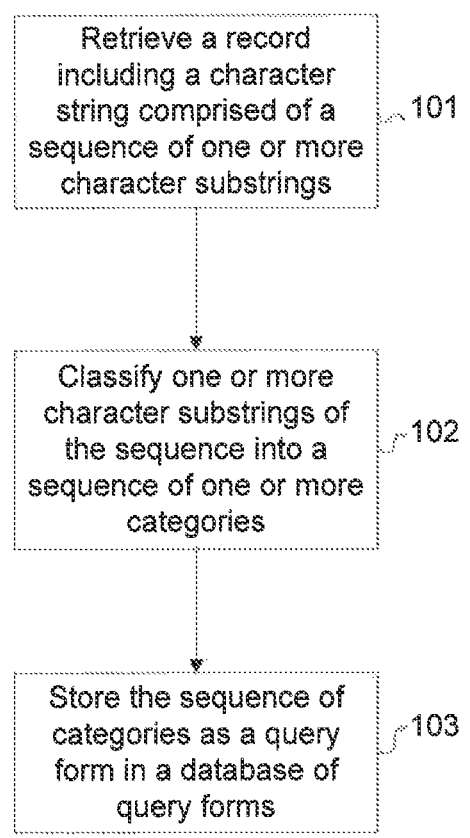
FIG. 1 illustrates an exemplary method for identifying a sequence of categories corresponding to a search query and storing the sequence as a query form, consistent with embodiments of the present disclosure.

Reference will now be made in detail to the present embodiments of the disclosure, certain examples of which are illustrated in the accompanying drawings.

Embodiments of the present disclosure encompass computer-implemented systems and methods for parsing search queries. Embodiments of the present disclosure also provide computer-implemented systems and methods that generate a list of query templates. Such systems and methods may retrieve a log of past search queries and identify query forms for the past search queries. The most frequently occurring query forms may be stored as query templates in a list of query templates. A search provider may then use the query templates to parse and semantically annotate future search queries.

Embodiments of the present disclosure also encompass computer-implemented systems and methods that utilize a list of query templates to parse search queries. Such systems and methods may compare sequences of terms or phrases in search queries with the query templates. When matching query templates are found, the terms or phrases in the search queries may be semantically annotated based on the form of the query template.

Embodiments of the present disclosure further encompass computer-implemented systems and methods that can address the problems of conventional online search services and techniques. For example, embodiments of the present disclosure provide improved systems and methods that can identify a form of a search query based on a pre-stored query template. Users often enter search queries in the same manner. By using pre-stored templates of common query forms, a search provider can better determine a user's intent when parsing a search query. This allows the search provider to better classify the terms or phrases of a search query and provide more relevant search results. Furthermore, systems and methods consistent with the present disclosure may provide increased customer satisfaction of a search provider's services, which may stimulate additional use of these search services. This may result in higher revenue for the search provider through, for example, additional sales of online advertising associated with the search services.

In accordance with embodiments described herein, a search provider may provide one or more web servers including a search engine for processing user search queries received over a network, such as the Internet. A search query may include one or more terms or phrases submitted by a user to search an available pool of information indexed by the web server(s). The web server(s) may receive a search query as a character string including one or more terms or phrases.

A character string may include a sequence of characters. The sequence of characters may include one or more alphanumeric characters, accented characters, diacritics, spaces, character returns, punctuation, and/or any other character commonly entered by a user with a keyboard and/or provided in a character-encoding scheme, such as American Standard Code for Information Interchange (ASCII) or UCS Transformation Format-8-bit (UTF-8). A character string may include one or more query terms or phrases entered by a user. For example, a character string may include one or more words, phrases, abbreviations, acronyms, and/or numbers.

FIG. 1 illustrates an exemplary method 100, consistent with embodiments of the present disclosure. Exemplary method 100 may be implemented in a computing environment (see, e.g., FIG. 6) using one or more computer systems (see, e.g., FIG. 7). In some embodiments, method 100 is performed by one or more web servers or computer systems associated with a search engine that is accessible to users over a network, such as the Internet.

In step 101, a record is retrieved. The record may be indicative of a prior search attempt, and may be retrieved from a query log of prior search attempts. The record may include, for example, a character string, an identifier, an indication of a time, and/or an indication of a number of results returned from the search attempt. The character string may include a sequence of one or more character substrings, such as terms or phrases, entered by a user during the search attempt. For example, a character string "pizza Arlington VA" may comprise a sequence of character substrings ("pizza", "Arlington", "VA"), or a sequence of character substrings ("pizza", "Arlington VA"). The identifier may identify the user's search session with a session identifier or a user identifier. The indication of time may indicate a time when the search attempt was conducted.

In step 102, one or more character substrings of the character string may be classified into a sequence of one or more categories. A category may include any category, including, for example, a preposition (for terms such as "near", "around", and "in", for example), street, neighborhood, county, postal code, city, state, country, franchise, or search substring. For example, "pizza Arlington VA" may be classified into a sequence of categories (search substring, city, state), with "pizza" classified as a search substring, Arlington classified as a city, and VA classified as a state. Alternatively, "pizza Arlington VA" may be classified into a sequence of categories (search substring, location), with "pizza" classified as a search substring, and Arlington VA classified as a location.

In step 103, the sequence of categories may be stored as a query form in a database of query forms. For example, the sequence (search substring, city, state) may be stored as the form of the query entered by the user in the search attempt.

Many different approaches may be taken to classify the character substrings of a character string into a sequence of categories. For example, web server(s) or computer system(s) may include programmed instructions for automatically determining the sequence of categories. Alternatively, an operator of the web server(s) or computer system(s) may review a character string of a search query record, determine a category for substrings in the character string, and create a query form containing a sequence of categories corresponding to the substrings.

Figure 2:
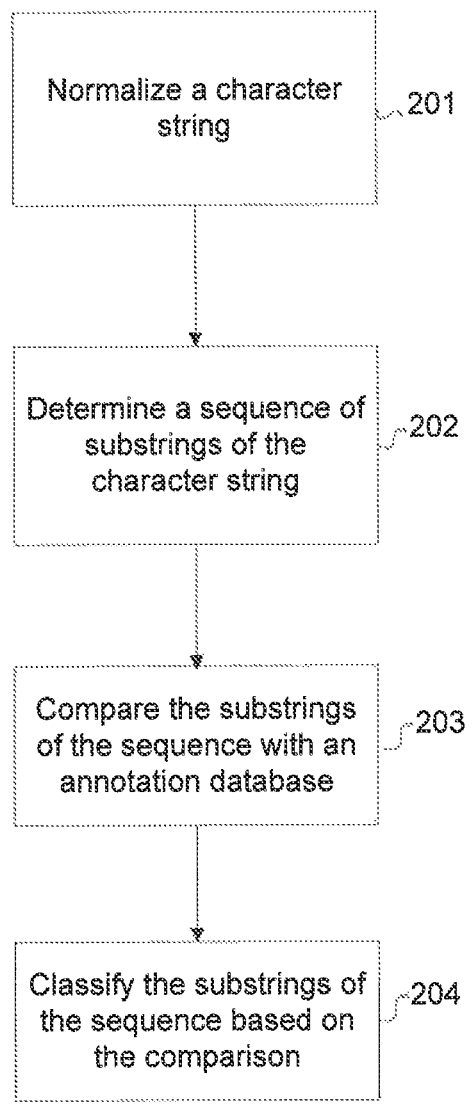
FIG. 2 illustrates an exemplary method for identifying a sequence of categories corresponding to a sequence of character substrings of a search query, consistent with embodiments of the present disclosure.

FIG. 2 illustrates an exemplary method 200 for automatically determining a sequence of categories, consistent with embodiments of the present disclosure. Similar to method 100, exemplary method 200 may be implemented in a computing environment (see, e.g., FIG. 6) using one or more computer systems (see, e.g., FIG. 7). Further, method 200 may be implemented on the same or different web server(s) or computer system(s) associated with the other exemplary methods disclosed herein, including method 100. Moreover, step 102 of method 100 may be performed utilizing method 200, for example.

In step 201, a character string may be normalized into a standard format. This may involve one or more of, for example, capitalizing a first character of one or more words, removing punctuation, removing one or more spaces between words, removing one or more character accents or diacritics, and normalizing standard terms (e.g., Street→St, Saint→St). A character string such as "pizza, reston?" may be normalized to "Pizza Reston", for example. Normalizing the character string may make it easier for the system to classify substrings of the character string.

In step 202, a sequence of substrings in the character string may be determined. This may occur in a variety of ways. For example, some programming languages, such as PHP, provide for easy determination of terms from a character string. Alternatively, the character string may be broken into a sequence of terms by tokenizing the character string based on a predetermined character delimiter, such as a space. Once the sequence of character substrings has been determined, the method may proceed to step 203.

In step 203, character substrings from the sequence may be compared with an annotation database containing terms or phrases already annotated with corresponding term or phrase categories. For example, character substrings from the sequence may be compared with terms or phrases in a dictionary categorizing terms or phrases. In step 204, if there is a match between a character substring and a term or phrase in the annotation database, the character substring may be classified with the category corresponding to the matching term or phrase. The result may include a sequence of categories corresponding to the sequence of character substrings. Once the sequence of categories has been determined, the method may proceed to step 103 of method 100, for example.

Figure 3:
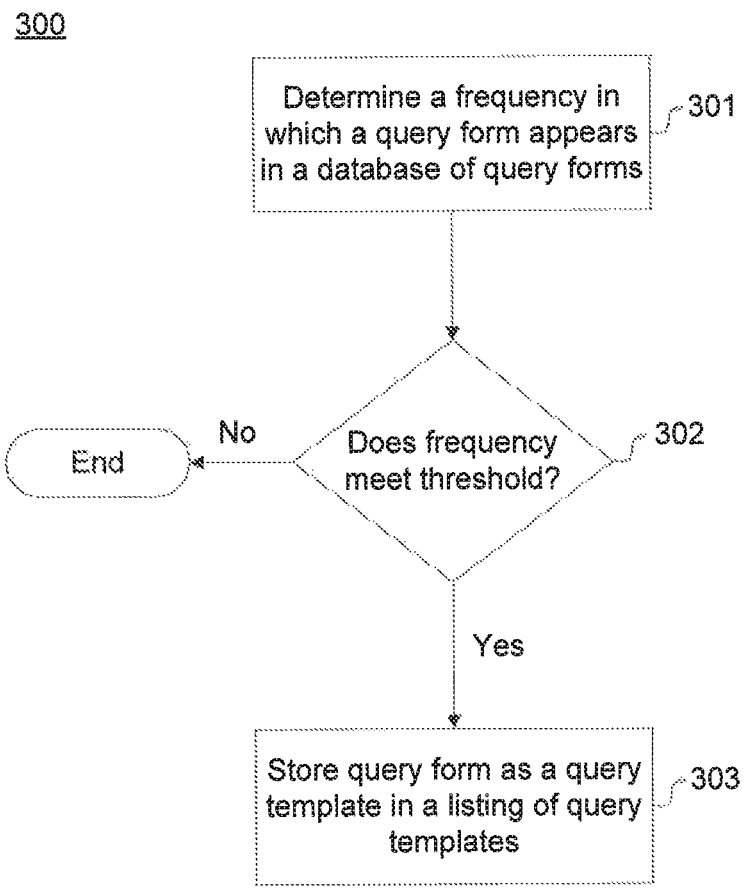
FIG. 3 illustrates an exemplary method for identifying the most frequently occurring sequences of categories in search queries, consistent with embodiments of the present disclosure.

FIG. 3 illustrates another exemplary method 300, consistent with embodiments of the present disclosure. Similar to methods 100 and 200, exemplary method 300 may be implemented in a computing environment (see, e.g., FIG. 6) using one or more computer systems (see, e.g., FIG. 7). Further, method 300 may be implemented on the same or different web server(s) or computer system(s) associated with the other exemplary methods disclosed herein, including methods 100 and 200.

In step 301, a frequency in which a query form appears in a database of query forms may be determined. The database of query forms may be generated, for example, by repeatedly performing method 100 for search records in a query log. For example, method 100 may be performed until the method has been performed on all of the search records in a query log. In step 302, it may be determined whether the frequency in which the query form appears in the database of query forms meets a determined threshold frequency value. If the frequency does not meet the determined threshold frequency value, method 300 may end. If the frequency does meet the determined threshold frequency value, method 300 may proceed to step 303. In step 303, the query form may be stored as a query template in a listing of query templates. The frequency with which query forms appear in a database may be determined automatically on a regular basis or in real-time by, for example, programmed instructions executed by one or more web server(s) or computer system(s). Alternatively, an operator may select a query form from the database of query forms to determine a frequency with which it appears. An operator may also graph a distribution of the frequency in which query forms appear in the database of query forms in a histogram, for example. The operator may then select a query form from among those appearing most frequently for storage in a listing of query templates.

A query form may also be modified prior to or after storage as a query template in the list of query templates. For example, a "city" category in a query template may be modified to correspond only to popular cities, such as cities containing at least a certain population size. Alternatively, a category may be split into subcategories over a plurality of query templates. For example, a plurality of query templates may be created, each containing a city subcategory corresponding to a city of a particular size. For instance, (City Population Category 1, Franchise) and (City Population Category 3, Franchise) query templates may be created, where category 1 may refer to cities with a population of at least 500,000, and where category 3 may refer to cities with a population of at least 75,000. Boolean operators, such as AND or OR operators, may also be included between categories of a query template. For example, a query template (City Population Category 1 AND (Category OR Franchise)) may be created, and may indicate a query requiring both a character substring representing a city of population category 1 and a character substring representing either a category or a franchise. Query forms may be modified automatically by the web server(s) or computer system(s) using defined modification scenarios or machine learning. Alternatively, an operator may modify query forms.

By performing method 300, web server(s) or computer system(s) may identify the most common sequences of substring categories entered by users in search queries, and may store these most common sequences as query templates. These query templates may then be used by the web server(s) or computer system(s) to more quickly and accurately parse future search queries, as further described below. Examples of generated query templates may include, for example, (City AND State AND Postal Code), (Street AND City AND State AND Postal Code), (Search Term AND Postal Code), (City Population Category 1 AND (Category OR Franchise)), (City), (State), (Country), (Street), and (Known Query).

Figure 4:
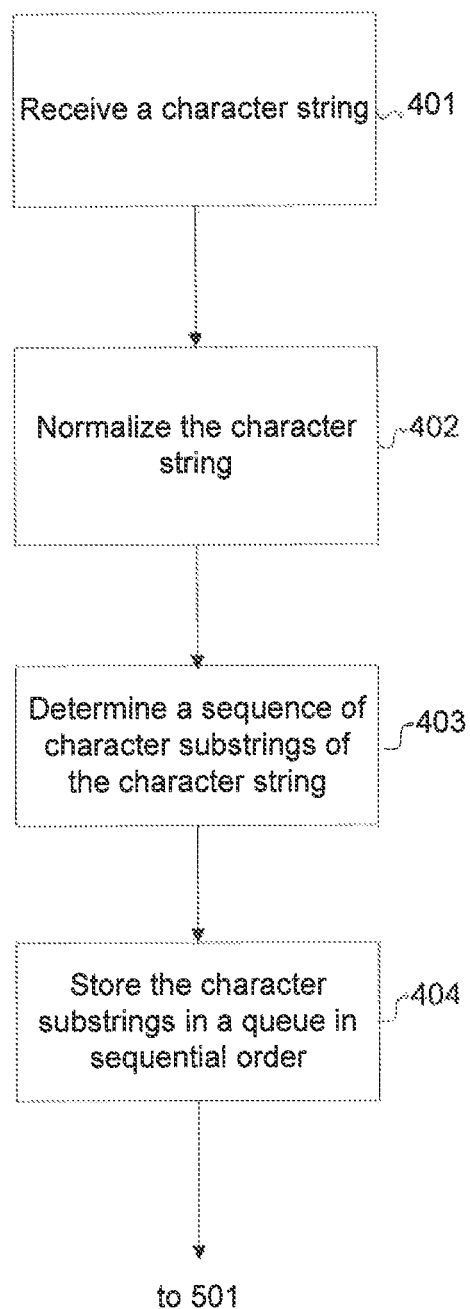
FIG. 4 illustrates an exemplary method for identifying a sequence of character substrings of a search query and storing the sequence of character substrings in a queue, consistent with embodiments of the present disclosure.

FIG. 4 illustrates an exemplary method 400, consistent with embodiments of the present disclosure. Similar to methods 100, 200, and 300, exemplary method 400 may be implemented in a computing environment (see, e.g., FIG. 6) using one or more computer systems (see, e.g., FIG. 7). Further, method 400 may be implemented on the same or different web server(s) or computer system(s) associated with the other exemplary methods disclosed herein, including methods 100, 200, and 300, as well as exemplary method 500.

In step 401, a character string may be received. The character string may include a sequence of one or more character substrings, such as terms or phrases, entered by a user during a search attempt. For example, a character string "pizza Arlington VA" may comprise a sequence of character substrings ("pizza", "Arlington", "VA"), or a sequence of character substrings ("pizza", "Arlington VA"). In one embodiment, the search attempt may be pending when the character string is received.

In step 402, the character string may be normalized into a standard format. This may involve one or more of, for example, capitalizing a first character of one or more words, removing punctuation, removing one or more spaces between words, removing one or more character accents or diacritics, and normalizing standard terms (e.g., Street→St, Saint→St). A character string such as "pizza, reston?" may be normalized to "Pizza Reston", for example. Normalizing the character string may make it easier for the system to parse and annotate the character string.

In step 403, a sequence of substrings (e.g., terms, phrases) in the character string may be determined. This may occur in a variety of ways. For example, some programming languages, such as PHP, provide for easy determination of terms from a character string. Alternatively, the character string may be broken into a sequence of substrings by tokenizing the character string based on a predetermined character delimiter, such as a space. In step 404, the character substrings of the sequence of character substrings may be stored in a queue in sequential order. After the character substrings are stored in a queue, the method may proceed to step 501 of method 500.

Figure 5:
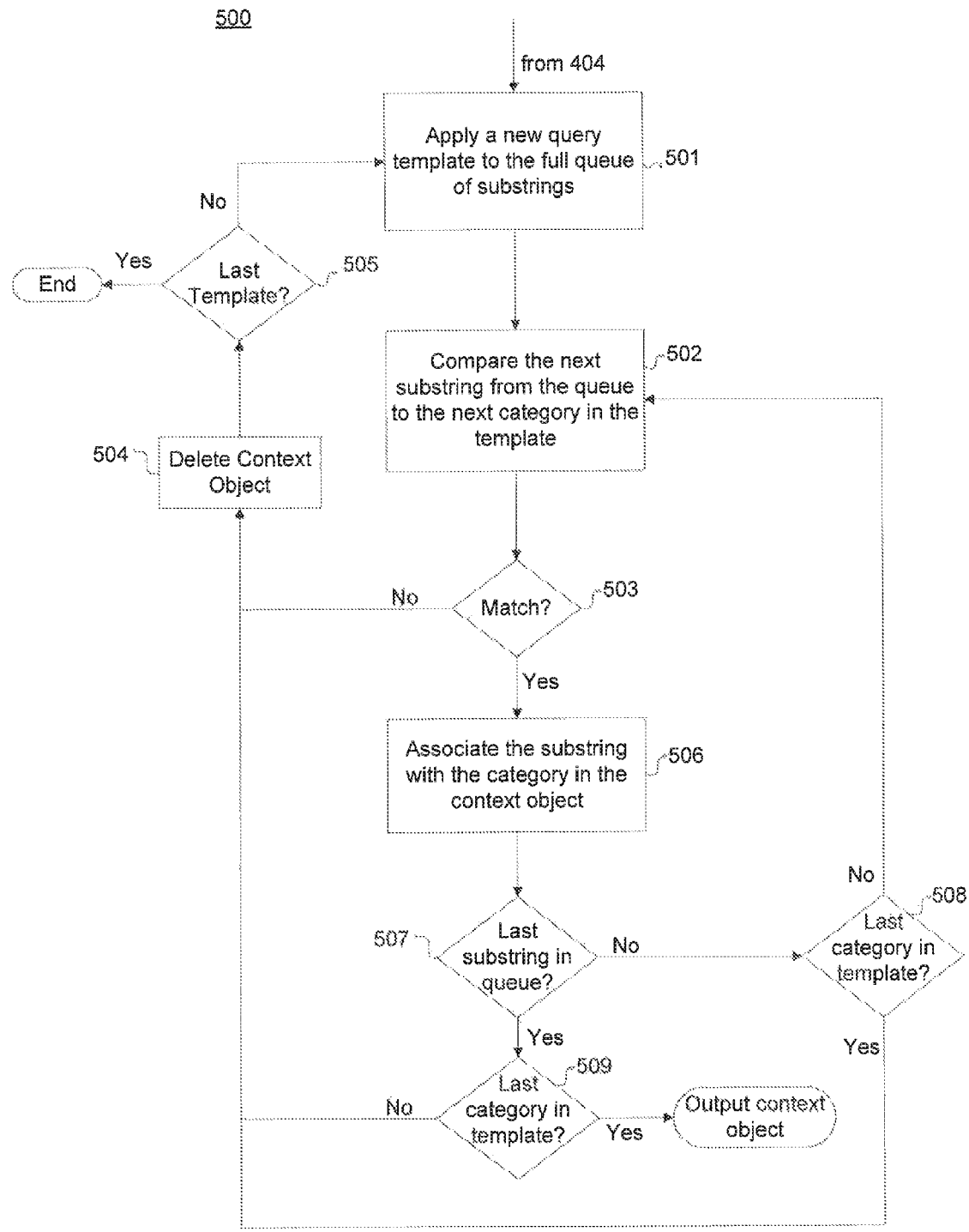
FIG. 5 illustrates an exemplary method for applying query templates to a queue of character substrings to determine whether one of the query templates matches the sequence of character substrings, consistent with embodiments of the present disclosure.

FIG. 5 illustrates another exemplary method 500, consistent with embodiments of the present disclosure. Similar to the other methods disclosed herein, exemplary method 500 may be implemented in a computing environment (see, e.g., FIG. 6) using one or more computer systems (see, e.g., FIG. 7). Further, method 500 may be implemented on the same or different web server(s) or computer system(s) associated with the other exemplary methods disclosed herein, including method 400 and/or any of the other methods disclosed herein.

Method 500 may iteratively apply query templates from the list of query templates to the queue of substrings until a matching query template is found. The query templates may be applied in a particular order. For instance, a query template that requires the least amount of processing to identify matches or that provides the most accurate matches may be applied first. For example, the web server(s) or computer system(s) may first apply a (City AND State AND Postal Code) template, followed by a (Street AND City AND State AND Postal Code) template, followed by a (Search Substring AND State AND Postal Code) template, followed by a (City Population Category 1 AND (Category OR Franchise)) template, followed by a (Known Query) template. Once a match occurs between a sequence of substrings and one of these templates, the iterative process may end.

In step 501, a new query template may be applied to the queue of character substrings. For example, the queue of substrings may be "Tomato", "PA", "17603" from an original character string "Tomato PA 17603". In this example, the user may have intended to search for a restaurant with the word "Tomato" in the name, located in Pennsylvania in postal code 17603. In step 501, the web server(s) or computer system(s) may also create a new context object in which to store matches between the substrings and categories of the query template. If this is the first time step 501 is applied to the queue of substrings, the applied query template may be the query template identified as the first to be applied in a particular order. For example, the system may first apply a (City AND State AND Postal Code) template. In step 502, a next substring in the queued substrings is compared to the next category in the query template. The substrings may be compared with the categories of the query template in sequential order, or reverse sequential order, based on whether the first or last category operator in the template has a higher level of granularity. For example, if the template is (City AND State AND Postal Code), the substrings may be compared with the categories in reverse sequential order, because identifying a substring as a postal code may require less processing than identifying an alphabetical substring as a city.

In step 503, the web server(s) or computer system(s) may determine whether the substring matches the category. In the case of categories with Boolean OR operators disposed between them, the web server(s) or computer system(s) may determine whether the substring matches any of the categories that are ORed together. If it is determined that the substring does not match the category, the method may proceed to step 504. In step 504, the context object may be deleted and the method may proceed to step 505. In step 505, the web server(s) or computer system(s) may determine whether the last template applied to the queue was the last template to be applied in the order of templates. If it was, method 500 may end. If it was not, method 500 may start over and the next query template may be applied to the full queue of substrings.

If in step 503, the web server(s) or computer system(s) instead determines that the substring does match the category, the method may proceed to step 506. In step 506, an association between the substring and the matched category in a context object may be stored (e.g., in a database) and the method may proceed to step 507. In step 507, the web server(s) or computer system(s) may determine whether the last matched substring was the last substring in the queue. If it was not, the method may proceed to step 508. In step 508, the the web server(s) or computer system(s) may determine whether the last compared category of the query template was the last category in the query template. If it was the last category in the query template, the method may proceed to step 504. If it was not the last category in the query template, the method may proceed to step 502, where the next substring in the queue of substrings may be compared to the next category in the template. If step 503 last determined whether the substring matched one of a plurality of ORed categories, the next category in the template may be the next ANDed category. If in step 507 the last matched substring was the last substring in the queue, the method may proceed to step 509. In step 509, the web server(s) or computer system(s) may determine whether the last category compared was the last category in the template. If it was not, the method may proceed to step 504. If it was, the context object may be output and/or stored.

By way of example, consider the application of method 500 to a sequence of substrings "Tomato", "PA", and "17603", and that may apply query templates in the following order: (City AND State AND Postal Code), followed by (Street AND City AND State AND Postal Code), followed by (Search Substring AND State AND Postal Code), followed by (City Population Category 1 AND (Category OR Franchise)), followed by (Known Query). In applying (City AND State AND Postal Code), the web server(s) or computer system(s) may first determine that "17603" matches Postal Code, and then determine that "PA" matches State, but may find that "Tomato" does not match City. Similarly, in applying (Street AND City AND State AND Postal Code), the web server(s) or computer system(s) may determine that the template does not match upon determining that "Tomato" does not match City. In applying (Search Substring AND State AND Postal Code), the web server(s) or computer system(s) may determine that "17603" matches Postal Code, "PA" matches State, and "Tomato" matches Search Substring. Accordingly, the context object may be output for storing these category and character substring associations. Thus, by performing methods 400 and 500 on a character string, the character string may be matched with a query template identifying a structure of the query, and terms or phrases of the character string may be associated with search categories based on the identified structure.

In performing step 503 of method 500, different approaches may be implemented for matching a character substring with a query template category. These approaches may differ based on the query template category. For example, a pattern matching approach may be used to determine whether a character substring is a postal code. Such a pattern matching approach may determine whether the character substring corresponds to a pre-determined pattern, such as whether it is five digits long (e.g., "17603"), five digits followed by a space followed by four digits (e.g., "17603 3805"), or five digits followed by a hyphen followed by four digits (e.g., "17603-3805"). If a character substring matches any of these patterns, the web server(s) or computer system(s) may determine that the substring matches the category Postal Code. Other categories may be matched with a character substring by using one or more files of known terms or phrases corresponding to the categories. For example, the web server(s) or computer system(s) may determine whether a character substring matches the category State by identifying whether the character substring appears in a listing of terms representing states. The listing may store a plurality of terms or phrases for each state. For example, the listing may store "Pennsylvania", "PA", "Penna", or "Keystone State" to capture a variety of user query terms corresponding to the state of Pennsylvania. Similarly, the web server(s) or computer system(s) may determine whether a character substring matches the category City by determining whether the character substring appears in a listing of terms or phrases representing cities. The web server(s) or computer system(s) may also determine whether a character substring matches a category Known Query based on whether the character substring appears in a listing of terms or phrases representing known queries.

For some of the query template categories, a listing of terms or phrases may not be sufficient. For example, it may be difficult to match a category Street with a character substring, because street names are long and easily misspelled. When attempting to match a character substring with a category Street, the character substring may be normalized into a standard format. For example, a character substring "North Charlotte Avenue" may be normalized to "N Charlotte Ave". This may make it easier to perform the comparison. The normalized substring may then be compared to terms or phrases representing street names in a list. To account for minor misspellings, an algorithmic spell checker may be used to accommodate minor differences between the character substring and the corresponding terms or phrases in a list. Alternatively, an editorialized spell checker may be used to account for differences between the character substring and the terms or phrases in a list. The editorialized spell checker may pair incorrectly spelled terms or phrases with correctly spelled terms or phrases. For example, the editorialized spell checker may store common city state mismatches (e.g., Hilton Head NC→Hilton Head SC).

As previously noted, method 500 may attempt to match query templates with a sequence of character substrings until a match is found. Once a match is found and the context object is output, method 500 may end. In addition to this "return on first match" approach, other approaches may be implemented to classify a sequence of character substrings. In one additional approach, a plurality of query templates may be applied in aggregate, and associate character substrings with categories from each query template that matches. For example, query templates (Street), (City), (State), and (Country) may all be compared with a character substring, such as "Lancaster." Since Lancaster is both the name of a city in Pennsylvania, and a street in Baltimore, MD, the character substring may be associated with both City and Street categories in a context object.

After method 500 has been completed and a context object has been output, the context object may be used to search an available pool of information indexed by one or more web servers. Some of this information may be structured, and may contain metadata or be otherwise labeled. Character substrings from the context object may be searched against this information, and the categories associated with the character substrings may be compared with the labels and metadata in the indexed information to obtain more relevant results. Additionally or alternatively, the context object information may be utilized in one or more search algorithms to focus or otherwise refine a search.

Figure 6:
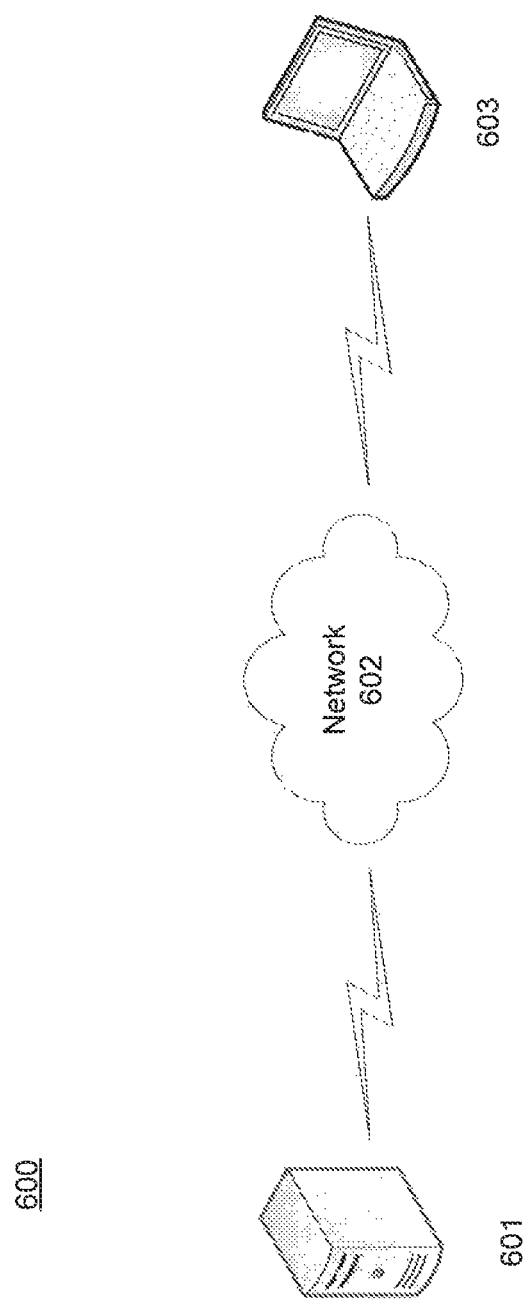
FIG. 6 illustrates an exemplary computing environment for implementing embodiments and features consistent with the present disclosure.

FIG. 6 is a diagram illustrating an exemplary computing environment 600 for implementing embodiments consistent with the present disclosure, including the above-described exemplary methods and features. In computing environment 600, a search provider may provide one or more computer system(s) 601 that enables search services. Computer system(s) 601 may include one or more web servers or other computing platforms for hosting web pages and/or software applications that handle and process search queries. Computer system 601 may also include back-end servers for processing current search queries, or analyzing past search queries.

A network 602 may connect computer system(s) 601 with one or more client device(s) 603. Network 602 may provide for the exchange of information, such as search queries and results, between client device(s) 603 and computer system(s) 601. Network 602 may include one or more types of networks interconnecting computer system(s) 601 with client device(s) 603. For example, one client device 603 may communicate with one or more computer system(s) 601 over a coaxial cable network, while a different client device 603 may communicate with one or more computer system(s) 601 over a cellular network. Network 602 may include one or more wide area networks (WANs), metropolitan area networks (MANs), local area networks (LANs), or any combination of these networks. Network 602 may include a combination of a variety of different network types, including Internet, Ethernet, twisted-pair, coaxial cable, fiber optic, cellular, satellite, IEEE 802.11, terrestrial, and/or other types of network connections. In some embodiments, network 602 comprises the Internet.

Client devices 603 may include a variety of different types of computing devices capable of communicating with computer system(s) 601 over network 602. These computing devices may include personal computers, laptops, personal digital assistants (PDA), telephones, televisions, set-top boxes, mobile phones, smart-phones, tablet computers, servers, and/or other types of computing devices. A user may use more than one type of client device to communicate with computer system(s) 601.

Figure 7:
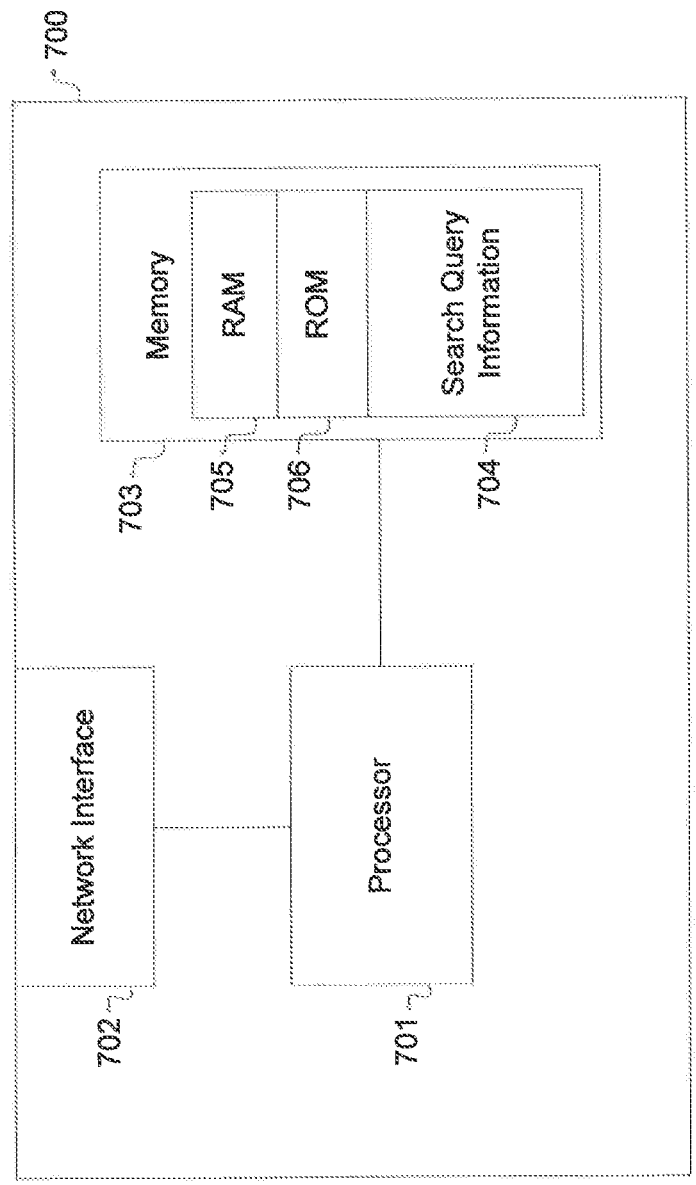
FIG. 7 illustrates an exemplary computer system for implementing embodiments and features consistent with the present disclosure.

FIG. 7 is a diagram illustrating an exemplary computer system 601 that may be used for implementing embodiments consistent with the present disclosure, including the exemplary systems and methods described herein. Computer system 601 may include one or more computers 700, which may be servers, personal computers, and/or other types of computing devices. Each computer 700 may include one or more processors 701 that may be any suitable type of processor. Processor 701 may be coupled to a network interface 702 for receiving and/or transmitting data and/or commands to/from other devices over a variety of networks, such as Internet, Ethernet, twisted-pair, coaxial cable, fiber optic, cellular, satellite, IEEE 802.11, terrestrial, or other wired or wireless networks.

Processor 701 may be coupled to one or more memory device(s) 703. Each memory device 703 may be configured to store instructions that, when executed by one or more processors 701, carry out the methods and techniques consistent with the present disclosure, including the exemplary methods and techniques described herein. Memory device 703 may also store an operating system, software applications, and/or parameters. Data stored on memory device 703 may be stored in a single dedicated memory, or over a plurality of memory devices. Memory device 703 may include any type of memory, physical, non-transient, volatile, or non-volatile, including, but not limited to, random access memory (RAM) 705, read-only memory (ROM) 706, magnetic strip storage, semiconductor storage, optical disc storage, and/or magneto-optical disc storage.

Memory device 703 may also include one or more database(s) 704 for storing search query information, such as search query logs and search records, statistical information regarding search queries, and/or any other information or data stored as a result of performing the disclosed methods, or required to perform the disclosed methods. For example, database(s) 704 may store a list of query templates and a plurality of query forms, as disclosed herein. Processor 701 may also be coupled to a computer providing a user interface for allowing input of information and commands to processor 701 and/or for allowing output of information and commands in a human-readable form.

As disclosed herein, search query records may be analyzed to identify common search query forms. The most frequently occurring query forms may be stored as query templates in a listing of query templates. These query templates may then be used for parsing and semantically annotating future search queries.

As also disclosed herein, a list of query templates may be used to parse and/or semantically annotate search queries. The query templates may be generated using one or more of methods 100, 200, or 300, as described herein. Alternatively, query templates may be retrieved from another source, or manually created by an operator. Through use of the methods described herein, a context object may be output for storage and/or use in a search. The context object may include one or more terms or phrases of a search query, and may associate the one or more terms or phrases with one or more categories.

The disclosed systems and methods provide a useful way of labeling search terms or phrases to yield more successful search results. For example, query templates can be created that represent the ways users most commonly enter search queries. These query templates may then be used in a search engine for quickly and accurately categorizing terms or phrases of a search query for focusing or otherwise further refining a search.

The many features and advantages of the disclosure are apparent from the detailed specification, and thus, it is intended that the appended claims cover all systems and methods, which fall within the true spirit and scope of the disclosure. As used herein, the indefinite articles "a" and "an" mean "one or more" in open-ended claims containing the transitional phrase "comprising," "including," and/or "having." Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A computer-implemented method comprising:
identifying, by one or more processors, a sequence of character sub strings in a character string;
generating, by the one or more processors, context objects for performing a search,
   the context objects including associations between search categories and character substrings;
storing, by the one or more processors and in a first context object, an association between a first search category and a first character substring in the sequence of character sub strings;
comparing, by the one or more processors, a second character substring in the sequence of character substrings and a second search category;
determining, by the one or more processors, that the first character substring in the sequence of character substrings corresponds to a third search category;
storing, by the one or more processors and in a second context object, an association between the third search category and the first character substring; and
searching, by the one or more processors, indexed information using at least the second context object.

2. The computer-implemented method of claim 1, wherein the third search category represents part of a geographical address.

3. The computer-implemented method of claim 1, wherein determining that the first character substring of the sequence of character substrings corresponds to the third search category comprises one or more of:
   identifying that the first character substring associates with a character pattern corresponding to the third search category; or
   identifying that the first character substring associates with a term or phrase corresponding to the third search category.

4. The computer-implemented method of claim 1, further comprising:
   determining that the second character substring in the sequence of character substrings corresponds to a fourth search category;
   associating the fourth search category with the second character substring; and
   storing in the second context object an association between the fourth search category and the second character substring.

5. The computer-implemented method of claim 1, further comprising:
   retrieving, from a storage device, at least one search query template including a sequence of the search categories.

6. The computer-implemented method of claim 5, further comprising:
   retrieving a first and second search query template including the sequence of the search categories,
      the second search query template being retrieved after determining that a character sub string of the sequence of character substrings does not correspond to a particular search category of the sequence of the search categories in the first search query template.

7. The computer-implemented method of claim 1, further comprising:
   determining that the second character substring of the sequence of character substrings does not correspond to the second search category of the sequence of the search categories; and
   discarding the association between the first search category and the first character substring.

8. A computer system for parsing a search query, comprising:
   a memory device that stores a set of instructions; and
   at least one processor to execute the set of instructions to:
      identify a sequence of character substrings in a character string;
      generate context objects for performing a search,
         the context objects including associations between search categories and character sub strings;
      store, in a first context object, an association between a first search category and a first character substring in the sequence of character sub strings;
      compare a second character substring in the sequence of character substrings and a second search category;
      determine that the first character substring in the sequence of character substrings corresponds to a third search category;
      store, in a second context object, an association between the third search category and the first character substring; and
      search indexed information using at least the second context object.

9. The computer system of claim 8, wherein the third search category represents part of a geographical address.

10. The computer system of claim 8, wherein the at least one processor is further to:
    identify that the first character substring associates with a character pattern corresponding to the third search category; or
    identify that the first character substring associates with a term or phrase corresponding to the third search category.

11. The computer system of claim 8, wherein the at least one processor is further to:
    determine that the second character substring in the sequence of character substrings corresponds to a fourth search category;
    associate the fourth search category with the second character substring; and
    store in the second context object an association between the fourth search category and the second character substring.

12. The computer system of claim 8, wherein the at least one processor is further to:
    retrieve, from a storage device, at least one search query template including a sequence of the search categories.

13. The computer system of claim 12, wherein the at least one processor is further to:
    retrieve a first and second search query template including the sequence of the search categories,
       the second search query template being retrieved after determining that a character sub string of the sequence of character substrings does not correspond to a particular search category of the sequence of the search categories in the first search query template.

14. A non-transitory computer-readable medium storing instructions, the instructions comprising:
    one or more instructions that, when executed by at least one processor, cause the at least one processor to:
       identify a sequence of character substrings in a character string;
       generate context objects for performing a search,
          the context objects including associations between search categories and character substrings;
       store, in a first context object, an association between a first search category and a first character substring in the sequence of character substrings;
       compare a second character substring in the sequence of character substrings and a second search category;
       determine that the first character sub string in the sequence of character sub strings corresponds to a third search category;
       store, in a second context object, an association between the third search category and the first character substring; and
       search indexed information using at least the second context object.

15. The computer-readable medium of claim 14, wherein the third search category represents part of a geographical address.

16. The computer-readable medium of claim 14, wherein the one or more instructions, that cause the at least one processor to determine that the first character sub string of the sequence of character substrings corresponds to the third search category, cause the at least one processor to at least one of:
    identify that the first character substring associates with a character pattern corresponding to the third search category; or identify that the first character substring associates with a term or phrase corresponding to the third search category.

17. The computer-readable medium of claim 14, wherein the one or more instructions, when executed by the at least one processor, further cause the at least one processor to:
   determine that the second character substring in the sequence of character substrings corresponds to a fourth search category;
   associate the fourth search category with the second character substring; and
   store in the second context object an association between the fourth search category and the second character substring.

18. The computer-readable medium of claim 14, wherein the one or more instructions, when executed by the at least one processor, further cause the at least one processor to:
   retrieve, from a storage device, at least one search query template including a sequence of the search categories.

19. The computer-readable medium of claim 18, wherein the one or more instructions, when executed by the at least one processor, further cause the at least one processor to:
   retrieve a first and second search query template including the sequence of the search categories,
      the second search query template being retrieved after determining that a character sub string of the sequence of character substrings does not correspond to a particular search category of the sequence of the search categories in the first search query template.

20. The computer-readable medium of claim 14, wherein the one or more instructions, when executed by the at least one processor, further cause the at least one processor to:
   determine that the second character substring of the sequence of character substrings does not correspond to the second search category of the sequence of the search categories; and
   discard the association between the first search category and the first character substring.

* * * * *